(12) United States Patent
Johnson

(10) Patent No.: US 8,500,147 B2
(45) Date of Patent: Aug. 6, 2013

(54) FOLDING SCOOTER

(75) Inventor: Mark Johnson, Cary, IL (US)

(73) Assignee: Radio Flyer Inc., Chicago, IL (US)

( * ) Notice: Subject to any disclaimer, the term of this patent is extended or adjusted under 35 U.S.C. 154(b) by 55 days.

(21) Appl. No.: 12/004,868

(22) Filed: Dec. 21, 2007

(65) Prior Publication Data

US 2009/0160150 A1 Jun. 25, 2009

(51) Int. Cl.
*B62M 1/00* (2010.01)

(52) U.S. Cl.
USPC ............ 280/87.05; 280/87.041; 280/87.021

(58) Field of Classification Search
USPC .... 280/87.01, 87.021, 87.05, 87.041–87.043, 280/47.315, 47.371, 47.17, 47.34, 47.36
See application file for complete search history.

(56) References Cited

U.S. PATENT DOCUMENTS

| | | | | |
|---|---|---|---|---|
| 1,227,888 A | * | 5/1917 | Converse | 280/87.041 |
| 3,811,151 A | * | 5/1974 | Kuemmerlin | 16/329 |
| 4,407,045 A | * | 10/1983 | Boothe | 16/327 |
| 4,566,150 A | * | 1/1986 | Boothe | 16/332 |
| 4,666,327 A | * | 5/1987 | Su | 403/24 |
| 4,821,832 A | * | 4/1989 | Patmont | 180/208 |
| 4,890,950 A | * | 1/1990 | Yoo | 403/96 |
| 5,388,659 A | * | 2/1995 | Pepe | 180/219 |
| 5,927,733 A | * | 7/1999 | Banda | 280/87.041 |
| 6,102,431 A | * | 8/2000 | Sutherland et al. | 280/642 |
| 6,182,988 B1 | | 2/2001 | Wu | |
| 6,213,484 B1 | * | 4/2001 | Rohner | 280/87.042 |
| 6,318,741 B1 | * | 11/2001 | Chen | 280/87.041 |
| 6,343,406 B1 | * | 2/2002 | Yeh | 16/328 |
| 6,428,021 B1 | | 8/2002 | Tung | |
| 6,450,517 B1 | * | 9/2002 | Lee | 280/87.041 |
| 6,491,312 B2 | | 12/2002 | Reynolds et al. | |
| 6,711,780 B2 | * | 3/2004 | Lee | 16/326 |
| 6,869,096 B2 | * | 3/2005 | Allen et al. | 280/642 |
| 7,025,522 B2 | | 4/2006 | Sicz et al. | |
| 7,293,934 B1 | | 11/2007 | Huang | |
| 7,632,035 B2 | * | 12/2009 | Cheng | 403/98 |
| 7,798,515 B2 | * | 9/2010 | Valdez et al. | 280/647 |
| 2001/0035621 A1 | * | 11/2001 | Herman et al. | 280/87.041 |
| 2002/0093161 A1 | | 7/2002 | Udwin et al. | |
| 2002/0131813 A1 | | 9/2002 | Chen | |
| 2002/0167143 A1 | | 11/2002 | Shaw | |
| 2003/0034622 A1 | * | 2/2003 | van Ardenne | 280/87.05 |
| 2006/0103096 A1 | | 5/2006 | Chen | |
| 2006/0103097 A1 | | 5/2006 | Chen | |

FOREIGN PATENT DOCUMENTS

| | | |
|---|---|---|
| DE | 100 33 327 A1 | 1/2002 |
| DE | 100 53 503 A1 | 5/2002 |
| DE | 102 15 102 A1 | 10/2003 |

* cited by examiner

*Primary Examiner* — J. Allen Shriver, II
*Assistant Examiner* — Travis Coolman
(74) *Attorney, Agent, or Firm* — McDermott Will & Emery LLP

(57) ABSTRACT

A folding scooter has an upright handlebar position, suitable for riding the scooter, and a folded handlebar position, suitable for storing the scooter. The folding scooter features a base, a handlebar shaft having locking hinge plates, and a base shaft having a lower locking hinge plate. The locking hinge plates of the handlebar shaft rotate with respect to the lower locking hinge plate as the handlebar shaft moves from the upright position to the folded position. A locking mechanism has a first locked position when the handlebar shaft is in the upright position, and a second locked position when the handlebar shaft is in the folded position.

20 Claims, 10 Drawing Sheets

FOLDING SCOOTER

BACKGROUND

The present invention relates to scooters that are typically used by children for entertainment, where a child stands on the scooter with one foot and uses the other foot to propel the scooter along a riding surface. More specifically, the present invention relates to a folding scooter, which has a handlebar shaft that can be rotated from an upright position to a folded position.

Scooters are a popular type of riding toy among children of various ages. Scooters typically have a base with at least a front wheel and a rear wheel. Scooters also typically have a handlebar shaft that extends upwards, generally perpendicular to the base, and has handlebars for a child to grip while riding the scooter.

Although scooters are generally more compact than other riding toys, such as tricycles and bicycles, the shape of scooters can result in difficulties for storing scooters or transporting them in a vehicle such as a car.

BRIEF SUMMARY OF THE INVENTION

The present invention relates to a scooter having an upright handlebar position, suitable for riding the scooter, and a folded handlebar position, suitable for storing the scooter.

In one aspect, the present invention provides a folding scooter comprising a base, a base shaft connected to the base, a front wheel rotatably attached to the base shaft, a rear wheel rotatably connected to the base, a handlebar shaft, and a locking mechanism. The base shaft has at least one lower locking hinge plate. The handlebar shaft has at least one locking hinge plate. Preferably, the exertion of manual force releases the locking mechanism and allows the handlebar shaft to be rotated from the upright position to the folded position. In at least some such embodiments, the locking mechanism comprises a locking key. Preferably, the locking key has a first locked position when the handlebar shaft is in the upright position and a second locked position when the handlebar shaft is in the folded position.

In another aspect, the present invention provides a folding scooter comprising a base, a rear wheel rotatably connected to the base, a base shaft connected to the base, a front wheel rotatably connected to the base shaft, a handlebar shaft having an upright position and a folded position, and a locking mechanism. In preferred embodiments, the handlebar shaft has at least a first locking hinge plate having a central aperture and a pair of locking apertures. More preferably, the handlebar shaft also has a second locking hinge plate having a central aperture and locking apertures that correspond to the central aperture and locking apertures of the first locking hinge plate. It is also preferred that the lower locking hinge plate has a central aperture, a first pair of locking apertures, and a second pair of locking apertures. Preferred locking mechanisms have a locking key having a handle, at least two locking pins, and a central pin that extends through the central apertures of the first locking hinge plate, the lower locking hinge plate, and the second locking hinge plate. Preferred locking mechanisms also have a button at the terminal end of the locking key opposite the handle, and a bias spring, located between the button and the second locking hinge plate, that exerts spring force on the button.

In yet another aspect, the present invention provides a folding scooter comprising a base, at least one rear wheel rotatably connected to the base, a handlebar shaft having an upright position and a folded position, a base shaft having at least one lower locking hinge plate that is received between the first and second locking hinge plates of the handlebar shaft in an interlocking manner, a front wheel rotatably connected to the base shaft, and a locking mechanism. The locking mechanism has a locking key that has a first locked position when the handlebar shaft is in the upright position and a second locked position when the handlebar shaft is in the folded position. Preferably, the handlebar shaft has a first locking hinge plate having a central aperture and a pair of locking apertures and a second locking hinge plate having a central aperture and a pair of locking apertures. Additionally, it is preferred that the lower locking hinge plate of the base shaft has a central aperture, a first pair of locking apertures, and a second pair of locking apertures.

The following detailed description of preferred embodiments of the invention, taken in conjunction with the accompanying drawings and claims, provide a more complete understanding of the nature and scope of the invention.

DETAILED DESCRIPTION OF THE INVENTION

Folding scooters of the present invention generally have a base, upon which a child can place one or both feet while riding the scooter, at least one rear wheel, and at least one front wheel. In some embodiments, scooters of the present invention can have more than one front wheel and/or more than one rear wheel. Folding scooters of the present invention also generally have a handlebar shaft having an upright position and a folded position. The handlebar shaft has handlebars that a child can grasp while riding the scooter. In the upright handlebar position, the handlebar shaft extends upwards from the base, and is perpendicular, or substantially perpendicular, to the base. In the folded handlebar position, the handlebar shaft is rotated downwards towards the base, and rests substantially parallel to the base, or at a small angle to the base.

Figure 1:
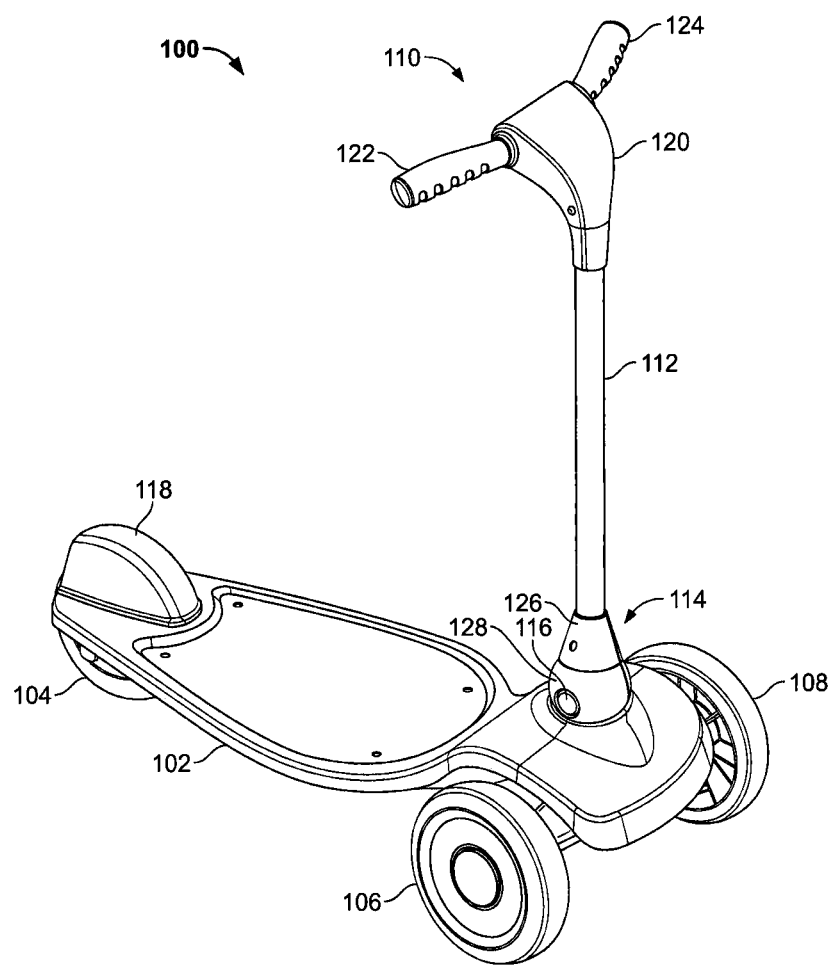
FIG. 1 is a front perspective view of one embodiment of a folding scooter of the present invention, in an unfolded configuration.

FIG. 1 illustrates one embodiment of a folding scooter of the present invention. In the illustrated embodiment, the folding scooter 100 has base 102, rear wheel 104 that is rotatably connected to the base 102, two front wheels 106 and 108, handlebar assembly 110, handlebar shaft 112, locking hinge housing 114, and locking hinge button 116. The front wheels 106 and 108 are rotatably connected to a base shaft (not shown), which is connected to the base 102. Additionally, rear wheel cover 118 is attached to base 102. As illustrated in FIG. 1, locking hinge housing 114 has upper section 126 and lower section 128. In at least some embodiments, the upper section 126 has two halves 126a and 126b, and the lower section 128 has two halves 128a and 128b (illustrated in FIG. 4 below). The folding scooter 100, as shown in FIG. 1, is in an unfolded configuration, ready to be ridden.

Figure 2:
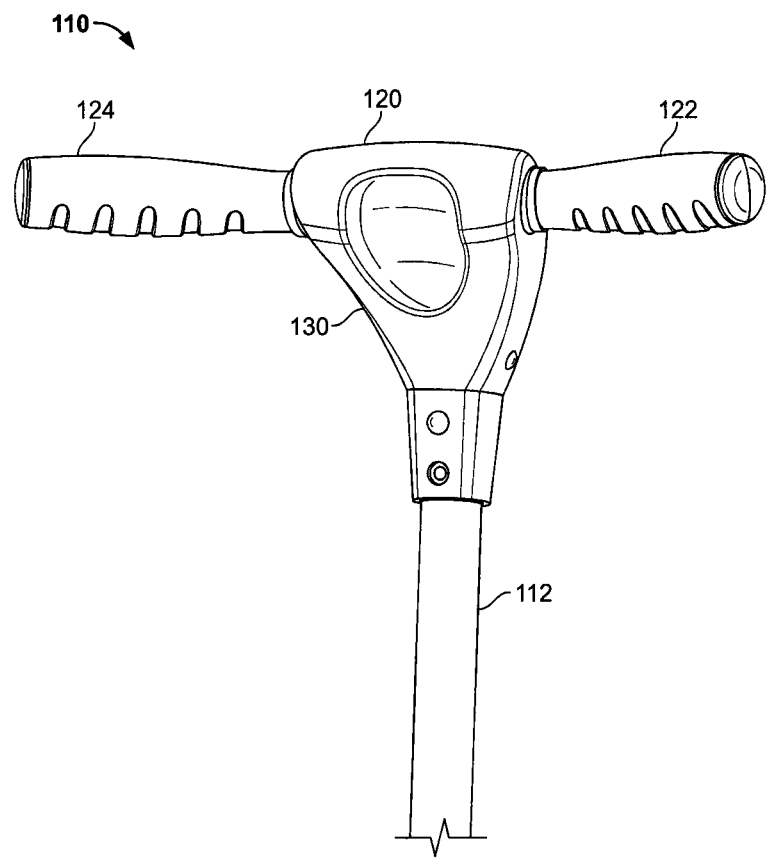
FIG. 2 is a rear perspective view of one embodiment of handlebars for a folding scooter of FIG. 1.

FIG. 2 further illustrates handlebar assembly 110 of folding scooter 100. Handlebar assembly 110 has a body 120, grips 122 and 124, and recessed section 130. Handlebar assembly 110 is attached to handlebar shaft 112. Handlebar assembly 110 can be attached to handlebar shaft 112 in any suitable manner, including, for example, by adhesive, by friction fit, or by hardware, including but not limited to, screws, pins, or clips. Recessed section 130 is preferably shaped to receive at least a portion of rear wheel cover 118. For example, when the folding scooter 100 is folded, the recessed section 130 of handlebar assembly 110 preferably fits over at least the top of rear wheel cover 118, and may extend over at least part of the sides of rear wheel cover 118. The length of the recessed section 130 of handlebar assembly 110 can is preferably be equal to or less than the length of the rear wheel cover 118, and is most preferably less than the length of the rear wheel cover 118.

Figure 3:
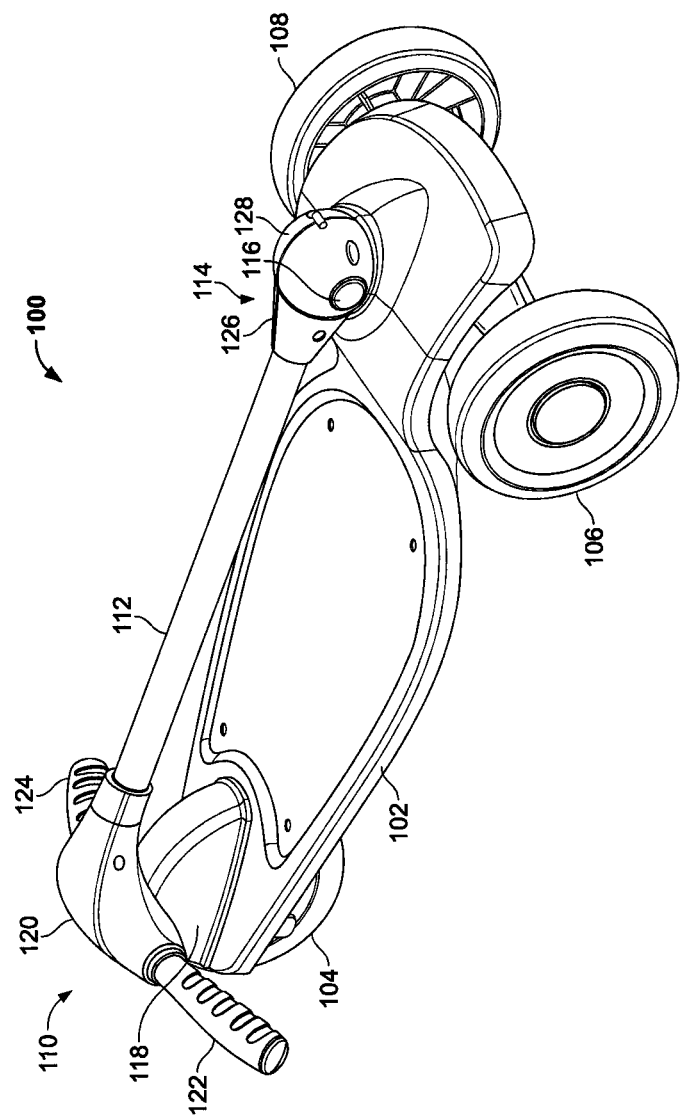
FIG. 3 is a front perspective view of the folding scooter of FIG. 1, in a folded configuration.

FIG. 3 illustrates the folding scooter of FIG. 1 in a folded configuration, generally appropriate for storing the scooter. As illustrated in FIG. 3, the handlebar assembly 110, handlebar shaft 112, and at least the upper section 126 of locking hinge housing 114 are rotated downwards, towards base 102 and rear wheel 104. In the illustrated embodiment, the body 120 of the handlebar assembly 110 is resting on the rear wheel cover 118. As discussed above with reference to FIG. 2, the handlebar assembly 110 preferably has a recessed section 130 that receives at least a portion of rear wheel housing 118, which improves the ability of the scooter 100 to fold in a compact manner. The handlebar shaft 112 preferably rests substantially parallel to the base, or at a small angle to the base, such as, for example, at an angle of less than about 20 degrees with respect to the base.

Figure 4:
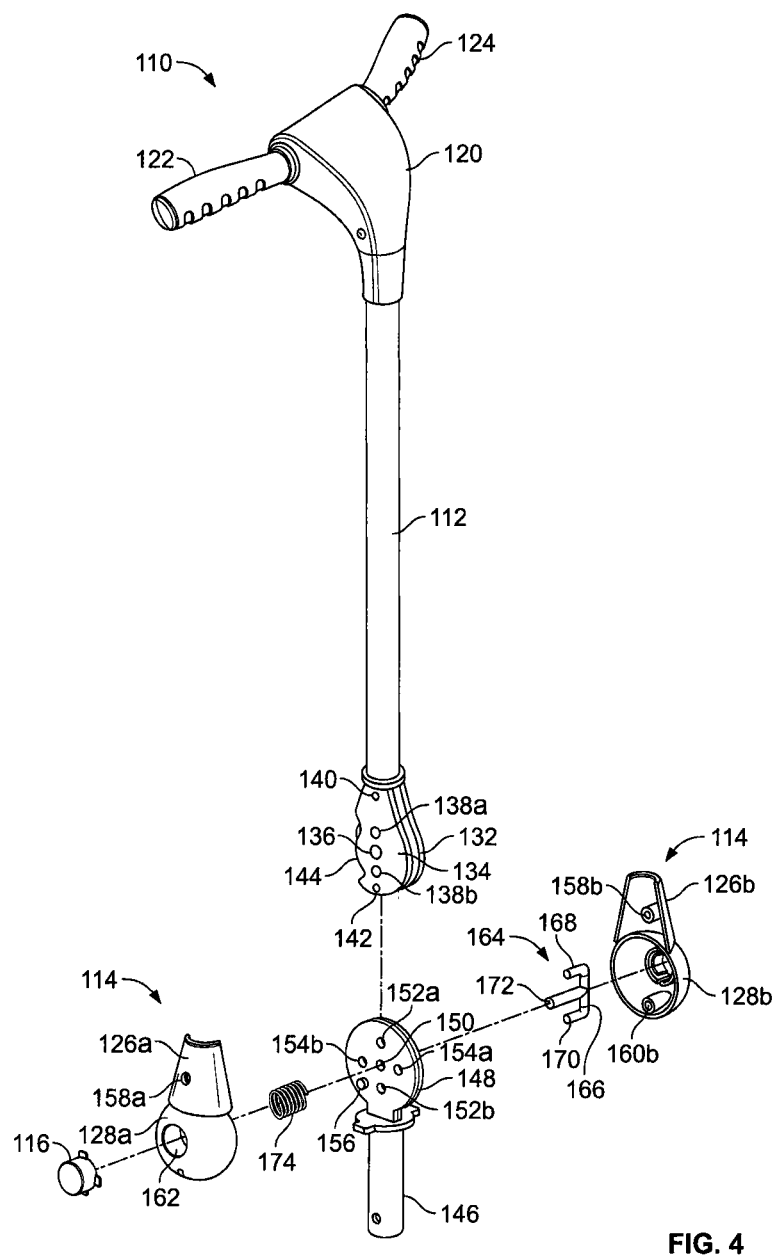
FIG. 4 is an exploded view of the locking hinge on the folding scooter embodiment of FIGS. 1-3.

FIG. 4 illustrates one preferred embodiment of a locking hinge mechanism that can be utilized in the folding scooter of FIG. 1 or 4. For ease of reference, the locking hinge mechanism of FIG. 4 is illustrated in a manner that corresponds to the folding scooter embodiment of FIG. 1. As illustrated, handlebar shaft 112 terminates at its upper end in handlebar assembly 110. At its lower end, handlebar shaft 112 terminates in at least one locking hinge plate. Preferably, as shown in FIG. 4, handlebar shaft 112 terminates in two locking hinge plates 132 and 134. Locking hinge plates 132 and 134 are preferably generally annular, rounded, or circular, in order to facilitate rotation of the locking hinge plates as the handlebar shaft 112 is moved from an upright locked position to a folded position. Locking hinge plates 132 and 134 each have a central aperture 136, and at least two locking apertures 138a and 138b. Locking hinge plates 132 and 134 preferably each have at least one fixation aperture, such as, for example, upper fixation aperture 140 and lower fixation aperture 142. In the embodiment of FIG. 4, locking hinge plate 134 also has a guide groove or notch 144. Preferably, both locking plates 132 and 134 each have a guide groove or notch 144.

As illustrated in FIG. 4, base shaft 146 terminates at its upper end in at least one locking hinge plate. As shown in FIG. 4, base shaft 146 terminates in lower locking hinge plate 148 that is preferably generally annular, rounded, or circular in shape. Lower locking hinge plate 148 interlocks with locking hinge plates 132 and 134 in a mating relationship, with locking hinge plate 138 sliding between locking hinge plates 132 and 134. Lower locking hinge plate 148 has a central aperture 150, and locking apertures 152a and 152b, that correspond, respectively, to the central aperture 136 and locking apertures 138a and 138b of locking hinge plates 132 and 134. Lower locking hinge plate 148 can have additional locking apertures, and preferably has locking apertures 154a and 154b located at about 90 degrees counterclockwise from locking apertures 152a and 152b, respectively. Lower locking hinge plate 148 preferably has a guide pin 156. Preferably, there is a guide pin 156 on each side of the lower locking hinge plate 148. In embodiments where the guide pin 156 is only on one side of lower locking hinge plate 148, the guide pin 156 corresponds to the guide groove or notch 144 on locking hinge plate 134. In embodiments having a guide pin 156 on each side of lower locking hinge plate 148, the guide pins 156 each correspond to guide groove or notch 144 on either locking hinge plate 132 or locking hinge plate 134.

The locking hinge housing 114 as illustrated in FIG. 4 is separated into its component parts. Upper halves 126a and 126b form the upper section of the locking hinge housing 114, and preferably have fixation apertures 158a and 158b. Lower halves 128a and 128b form the lower section of locking hinge housing 114, and preferably have fixation apertures 160a (not shown) and 160b. Lower half 128a also has button aperture 162 for receiving button 116.

Locking key 164, as illustrated in FIG. 4, has handle 166, locking pins 168 and 170, and central pin 172. In practice, central pin 172 of locking key 164 extends through central apertures 136 of locking hinge plates 132 and 134, as well as through central aperture 150 of lower locking hinge plate 148, and terminates at button 116. Central pin 172 can abut, or be connected to, button 116. Central pin 172 also extends through biasing spring 174, which is located between locking hinge plate 134 and button 116. The spring force exerted by biasing spring 174 pushes button 116 outwardly from locking hinge plate 134, thus maintaining the locking key 164 in a first locked position when the folding scooter is in an unfolded locked position.

When the folding scooter is in an upright locked position, the locking pins 168 and 170 of locking key 164 are preferably inserted into locking apertures 138a and 138b of locking hinge plates 132 and 134, as well as locking apertures 152a and 152b of lower locking hinge plate 148. Manual force exerted to overcome the spring force of biasing spring 174 will push button 116 inwards, towards locking hinge plate 134, and thus cause outward displacement of locking key 164, away from locking hinge plate 132. Upon sufficient outward displacement of locking key 164, locking pins 168 and 170 are disengaged from locking apertures 138a, 138b, 152a and 152b of locking hinge plates 132, 134 and 148. When the locking pins 168 and 170 are disengaged, locking hinge plates 132 and 134 can be rotated about central aperture 136 to move the handlebar shaft 112 and handlebar assembly 110 into a folded position.

The angle of rotation for locking hinge plates 132 and 134, as well as for handlebar shaft 112, from the upright locked position to the folded position is preferably up to at least about 90 degrees, and is more preferably from about 75 degrees to about 90 degrees. In preferred embodiments, base shaft 146 and lower locking hinge plate 148 are fixed in position with respect to central aperture 150, and do not rotate when handlebar shaft 112 is moved from an upright locked position to a folded position.

In at least some embodiments, when manual force is exerted to push locking pins 168 and 170 disengage from locking apertures 138a and 138b of locking hinge plate 134, and from locking apertures 152a and 152b of lower locking hinge plate 148, but not from the locking apertures of locking hinge plate 132. In such embodiments, locking key 164 can rotate with locking hinge plate 132 when handlebar shaft 112 is moved from an upright locked position to a folded position. Once handlebar shaft reaches the folded position, the locking apertures of locking hinge plate 132, as well as the locking apertures 138a and 138b of locking hinge plate, are in alignment with locking apertures 154a and 154b of lower locking hinge plate 148. Once the locking apertures are in alignment in the folded position, and upon release of any remaining manual force on button 116, the locking key 164 can be in a second locked position. In the second locked position, locking pins 168 and 170 engage locking apertures 154a and 154b of lower locking hinge plate 148, and re-engage locking apertures 138a and 138b of locking hinge pate 134, and thus lock the handlebar shaft 112 in its folded position.

Figure 9:
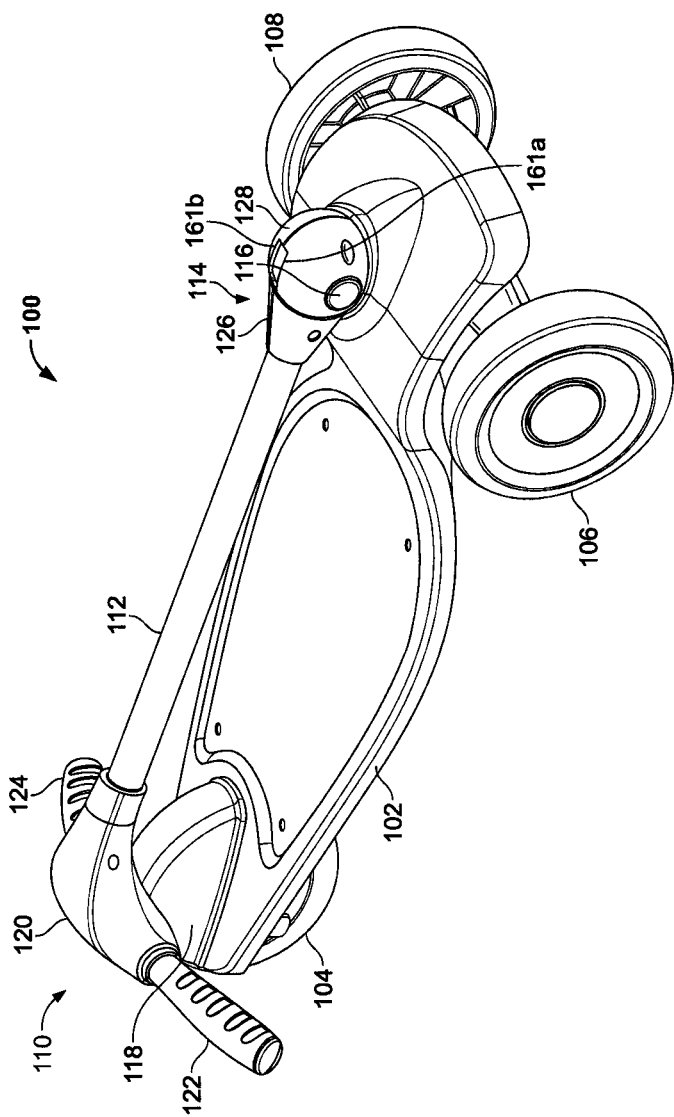
FIG. 9 is a front perspective view of a third embodiment of a folding scooter of the present invention, in a folded configuration.
Figure 10:
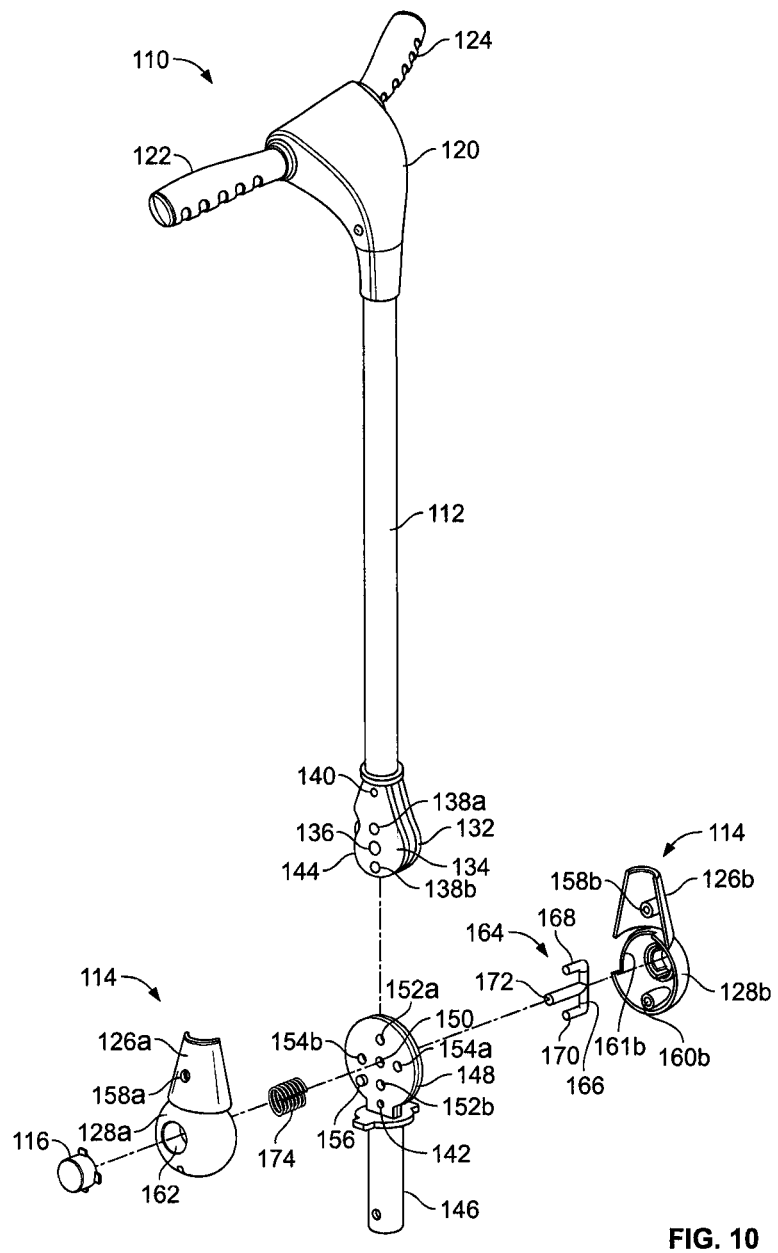
FIG. 10 is an exploded view of the locking hinge on the folding scooter embodiment of FIG. 9.

With reference to FIGS. 9 and 10, upper halves 126a and 126b of the locking hinge housing 114 are preferably connected to locking hinge plates 134 and 132, respectively, and are not connected to lower locking hinge plate 148. Upper halves 126a and 126b of the locking hinge housing 114 can, for example, be connected to locking hinge plates 134 and 132 by a pin, screw, clip, or other suitable fastening device, inserted through fixation apertures 158a and 158b of upper halves 126a and 126b, respectively, and fixation aperture 140 of locking hinge plates 132 and 134. Lower halves 128a and 128b of the locking hinge housing 114 are preferably connected to lower locking hinge plate 148 via lower fixation aperture 142, and are not connected to locking hinge plates 134 and 132. In such preferred embodiments, upper halves 126a and 126b of the locking hinge housing 114 rotate with respect to lower halves 128a and 128b of the locking hinge housing 114, just as locking hinge plates 132 and 134 rotate with respect to lower locking hinge plate 148, as handlebar shaft 112 is moved from an upright locked position to a folded position. The upper locking hinge plates 132 and 134 pass through a slot defined by notches 161a and 161b formed in the lower halves 128a and 128b of the locking hinge housing and travel through this slot as the handlebar shaft is moved between the upright locked and folded positions.

In preferred embodiments, guide pin 156 is at or near one end of guide notch or groove 144 when the handlebar shaft 112 is in an upright locked position, and is at or near the other end of guide notch or groove 144 when the handlebar shaft 112 is in a folded position. In such embodiments, guide notch or groove 144 slides relative to guide pin 156 as locking hinge plates 132 and 134 rotate when handlebar shaft 112 is moved from an upright locked position to a folded position.

Figure 5:
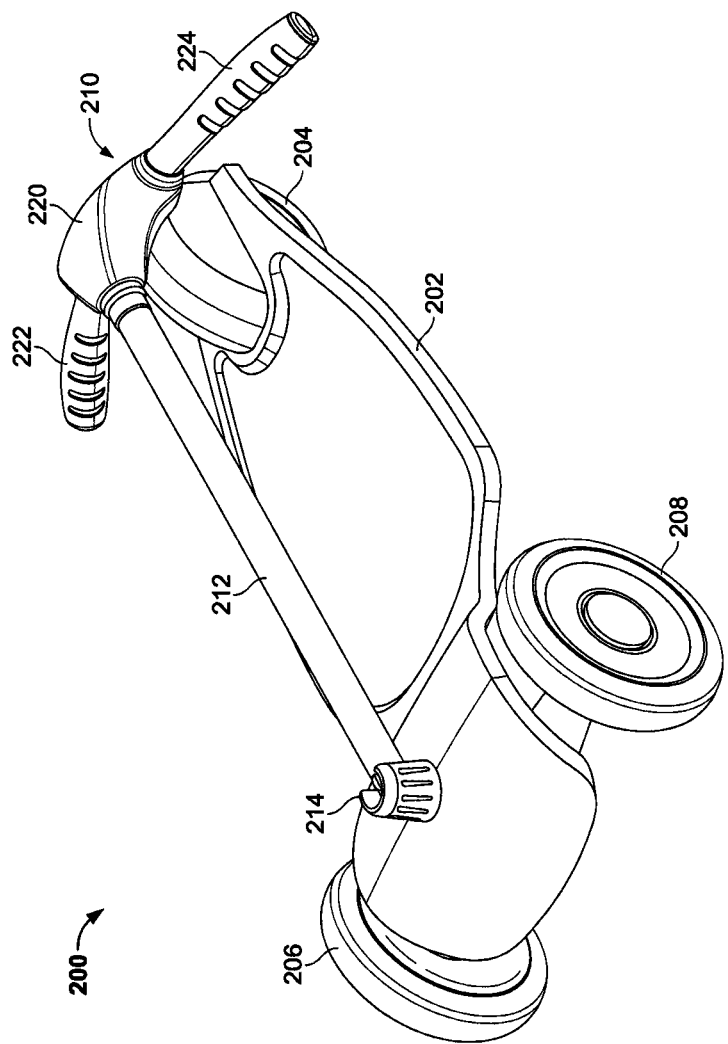
FIG. 5 is a front perspective view of a second embodiment of a folding scooter of the present invention, in an folded configuration.

FIG. 5 illustrates a second embodiment of a folding scooter of the present invention in a folded configuration. Folding scooter 200 has base 202, rear wheel 204, two front wheels 206 and 208, handlebar assembly 210, handlebar shaft 212, and locking hinge housing 214. Handlebar assembly 210 has a body 220, as well as grips 222 and 224. Rear wheel cover 218 is attached to base 202. As illustrated in FIG. 4, locking hinge housing 214 has a semi-circular or "U" shaped cross section with an opening wide enough for handlebar shaft 212 to pass through as it rotates from an upright locked position to a folded position. Preferably, locking hinge housing 214 closely abuts handlebar shaft 212 when the handlebar shaft 212 is in its upright locked position. Additionally, locking hinge housing 214 preferably has a height that is greater than the height of the locking hinge, so that the locking hinge is enclosed by the locking hinge housing when the bar shaft 212 is in its upright locked position.

Figure 6:
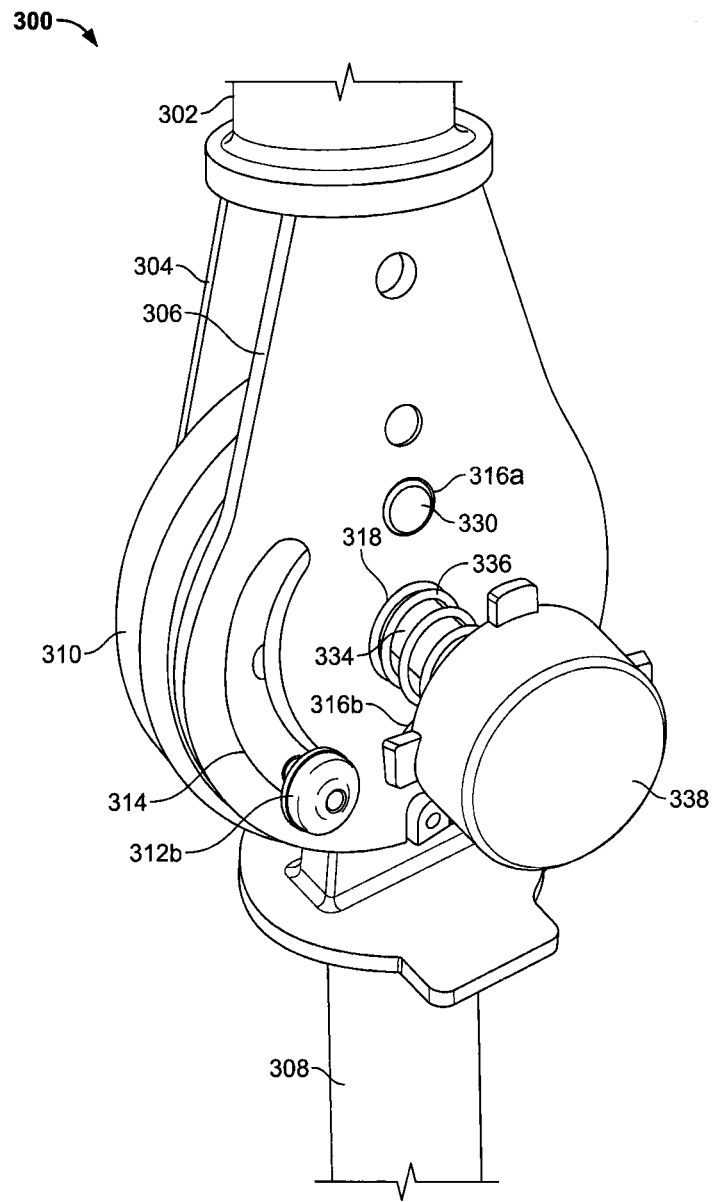
FIG. 6 is a right perspective view of a second embodiment of a locking hinge on a folding scooter of the present invention, in a locked unfolded position.
Figure 7:
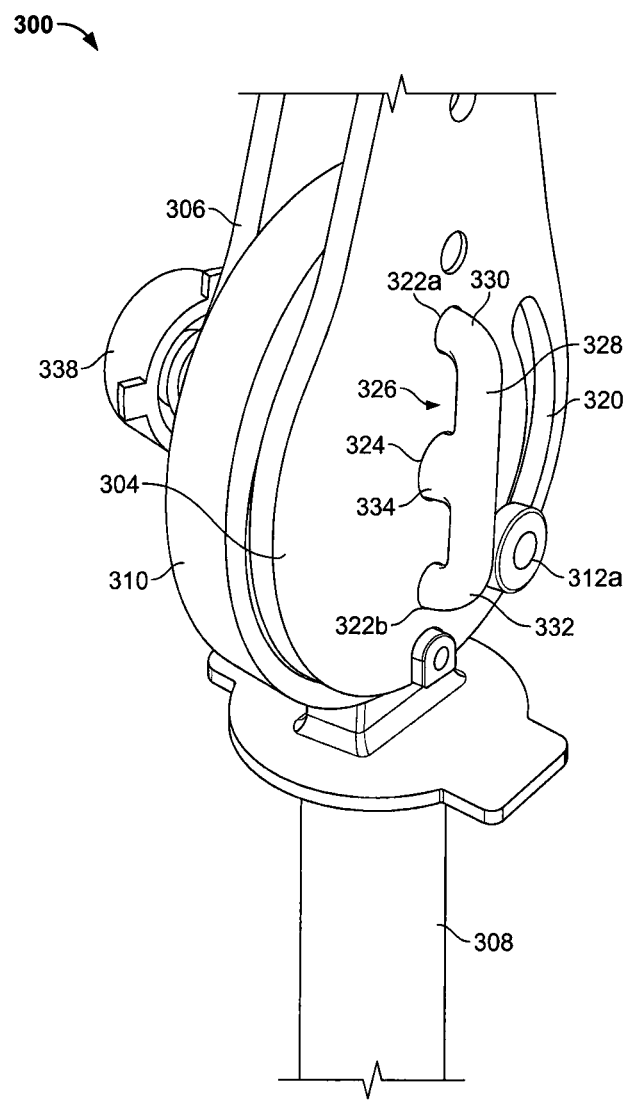
FIG. 7 is a left perspective view of the locking hinge of FIG. 6, in a locked unfolded position.
Figure 8:
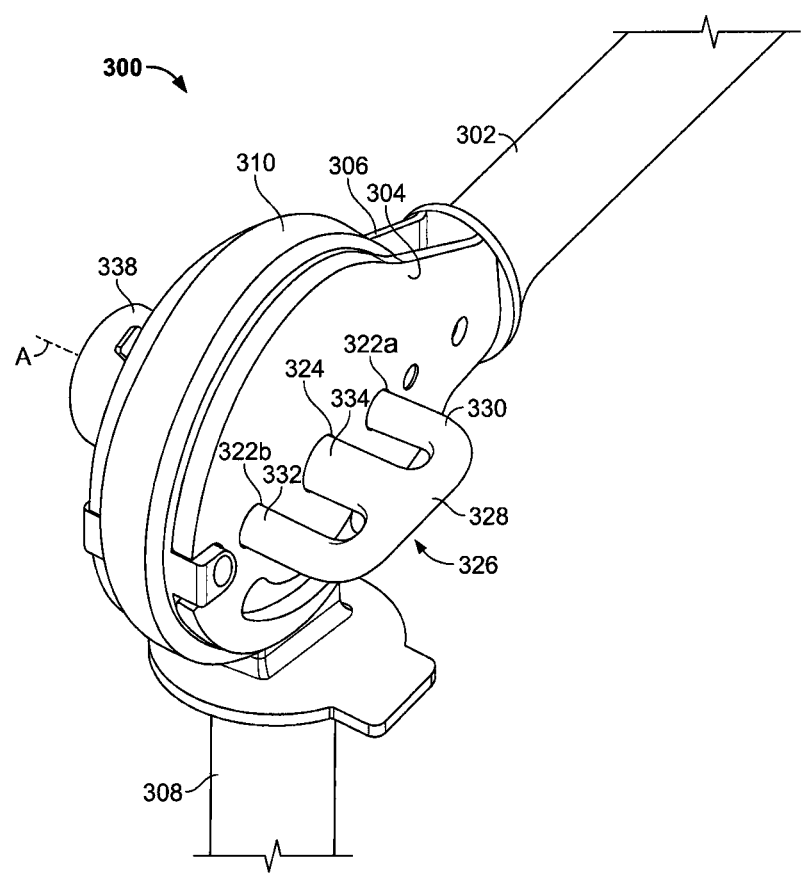
FIG. 8 is a left perspective view of the locking hinge of FIGS. 6-7, in an unlocked folded position.

FIGS. 6-8 illustrate a second embodiment of a locking hinge mechanism 300 that can be utilized with folding scooters of the present invention, such as those illustrated in FIGS. 1-5. Locking hinge mechanism 300 is shown in an assembled configuration, without the locking hinge housing removed, for illustrative purposes. As illustrated in FIGS. 6-8, handlebar shaft 302 terminates in locking hinge plates 304 and 306, and base shaft 308 terminates in lower locking hinge plate 310. Locking hinge plate 306 has guide groove 314, locking apertures 316a and 316b, and central aperture 318. Locking hinge plate 304 has guide groove 320, locking apertures 322a and 322b, and central aperture 324. Lower locking hinge plate 310 is received between locking hinge plates 304 and 306 in an interlocking manner. Lower locking hinge plate 310 has two guide pins 213a and 213b, one on each side of lower locking hinge plate 310. Lower locking hinge plate preferably has a central aperture and two pairs of locking apertures (not shown). When handlebar shaft 302, and the folding scooter, is in an upright locked position, a first pair of locking apertures on lower locking hinge plate 310 are oriented in a vertical position, corresponding to the upright position of locking apertures 316a and 316b of locking hinge plate 306, and to locking apertures 322a and 322b of locking hinge plate 304. A second pair of locking apertures are preferably oriented horizontally, at an angle of about 90 degrees from the first pair of locking apertures, corresponding to the folded position of locking apertures 316a and 316b of locking hinge plate 306, and to locking apertures 322a and 322b of locking hinge plate 304. Locking key 326 has handle 328, locking pins 330 and 332, and central pin 334.

As illustrated in FIGS. 6 and 7, handlebar shaft 302 is in an upright and locked position. Central pin 334 of locking key 326 extends through central apertures 318 and 324 of locking hinge plates 304 and 306, as well as through central aperture (not shown) of lower locking hinge plate 310, and terminates at button 338. Central pin 334 also extends through biasing spring 336, which is located between locking hinge plate 306 and button 338. The spring force exerted by biasing spring 336 pushes button 338 outwardly from locking hinge plate 306, thus maintaining the locking key in a first locked position. Locking pins 330 and 332 of locking key 326 are inserted into locking apertures 316a and 316b of locking hinge plate 306, the corresponding locking apertures (not shown) of lower locking hinge plate 310, and locking apertures 322a and 322b of locking hinge plate 304.

As illustrated in FIG. 8, handlebar shaft 302, and thus the folding scooter, is in a folded position. The locking mechanism 300 is illustrated in FIG. 8 as being acted upon by the exertion of manual force upon button 336 along axis A. Such manual force, exerted in an amount sufficient to overcome the spring force of biasing spring 336, pushes button 338 inwards, towards locking hinge plate 306, and causes outward displacement of locking key 326, away from locking hinge plate 304. Upon sufficient outward displacement of locking key 326, as illustrated in FIG. 8, locking pins 330 and 332 would be disengaged from locking apertures 316a and 316b of locking hinge plate 206, as well as from the corresponding locking apertures of lower locking hinge plate 310, but are not disengaged from locking apertures 322a and 322b of locking hinge plate 304. Locking hinge plates 304 and 306 have been rotated an angle of about 90 degrees about the central aperture of the lower locking hinge plate, to move the handlebar shaft 302 into a folded position. Base shaft 308 and lower locking hinge plate 310 are fixed in position such that they do not rotate when handlebar shaft 302 is moved from an upright locked position to a folded position. Locking key 326 has rotated in conjunction with locking hinge plate 304 when handlebar shaft 302 was moved from an upright locked position to a folded position. Locking key 326 is oriented in a sideways position, as compared to its vertical position when the handlebar shaft 302 in an upright position.

Upon release of the manual force being exerted on button 338 along axis A in FIG. 8, the spring force exerted by the bias spring would cause outward displacement of button 338, away from locking hinge plate 306, and inward displacement of locking key 326, towards locking hinge plate 304. Such displacement would move locking key 326 into its second locked position. When handlebar shaft 302 is in a folded position and locking key 326 is in its second locked position, locking pins 330 and 332 engage the second pair of locking apertures (not shown) on lower locking hinge plate 310, and re-engage locking apertures 138a and 138b of locking hinge pate 306. Handlebar shaft 302 is thus locked its folded position.

From the foregoing, it will be appreciated that although specific representative structures and processes have been described herein for purposes of illustration, various modifications may be made without deviating from the spirit or scope of the disclosure. It is therefore intended that the foregoing detailed description be regarded as illustrative rather than limiting, and that it be understood that it is the following claims, including all equivalents, that are intended to particularly point out and distinctly claim the disclosure subject matter.

What is claimed is:

1. A folding scooter comprising:
   a base;
   a rear wheel rotatably connected to the base;
   a base shaft connected to the base and having at least one lower locking hinge plate, the lower locking hinge plate comprising a central aperture, a first pair of locking apertures, and a second pair of locking apertures;
   a front wheel rotatably connected to the base shaft;
   a handlebar shaft having an upright position and a folded position, the handlebar shaft comprising at least a first locking hinge plate having a central aperture and a pair of locking apertures; and
   a locking mechanism, the locking mechanism comprising:
      a locking key having a handle, at least two locking pins, and a central pin that extends through the central apertures of the first locking hinge plate and the lower locking hinge plate;
      a push button, the button being at the terminal end of the locking key opposite the handle;
      a bias spring, the bias spring being located between the button and the first locking hinge plate, and exerting spring force on the button;
      said base shaft and said handlebar shaft pivoting with respect to the base so that the folding scooter may be steered; and
      a locking hinge housing covering said locking mechanism, said locking hinge housing including an upper section that engages the handlebar shaft and a lower section that is connected to the base shaft and is positioned adjacent to the base, the lower section including a button aperture through which the push button protrudes, and said upper and lower sections of the locking hinge housing pivoting with respect to the base when the folding scooter is steered and said upper section of the locking hinge housing sliding with respect to the lower section of the locking hinge housing as the handlebar shaft moves between the upright position and the folded position.

2. The folding scooter of claim 1, wherein the handlebar shaft further comprises a second locking hinge plate, the second locking hinge plate comprising:
   a central aperture that corresponds to the central aperture of the first locking hinge plate; and
   a pair of locking apertures that correspond to the locking apertures of the first locking hinge plate.

3. The folding scooter of claim 2, wherein the lower locking hinge plate of the base shaft is received between the first and second locking hinge plates of the handlebar shaft in an interlocking manner.

4. The folding scooter of claim 3, wherein, when the handlebar shaft is in the upright position, the locking pins of the locking key engage the locking apertures of the first and second locking hinge plates and the first pair of locking hinge apertures of the lower locking hinge plate.

5. The folding scooter of claim 4, wherein the exertion of manual force to overcome the spring force exerted on the button by the bias spring releases the locking mechanism and allows the handlebar shaft to be rotated from the upright position to the folded position.

6. The folding scooter of claim 5, wherein release of the locking mechanism comprises outward displacement of the handle of the locking key, away from the first locking hinge plate, the displacement being of sufficient amount that the locking pins disengage from the locking apertures of at least the second locking hinge plate and the lower locking hinge plate.

7. The folding scooter of claim 3, wherein, when the handlebar shaft is in the folded position, the locking pins of the locking key engage the locking apertures of the first and second locking hinge plates and the second pair of locking hinge apertures of the lower locking hinge plate.

8. The folding scooter of claim 1, wherein rotation of the handlebar shaft from the upright position to the folded position has an angle of rotation of about 90 degrees.

9. The folding scooter of claim 1, wherein the folding scooter comprises one rear wheel, and further comprises a handlebar assembly having a recessed section sized and shaped to receive a portion of the rear wheel or a rear wheel guard that engages the rear wheel, or a rear wheel guard connected to the base of the scooter, when the folding scooter is in the folded position.

10. The folding scooter of claim 1 wherein said first locking hinge plate includes a guide groove and said lower locking hinge plate includes a guide pin that engages said guide groove.

11. The folding scooter of claim 1, wherein the locking key has a first locked position when the handlebar shaft is in the upright position and a second locked position when the handlebar shaft is in the folded position.

12. The folding scooter of claim 1, wherein the folding scooter further comprises a handlebar assembly having a recessed section sized and shaped to receive a portion of the rear wheel or a rear wheel guard.

13. The folding scooter of claim 2, wherein the recessed section of the handlebar assembly engages the rear wheel, or a rear wheel guard connected to the base of the scooter, when the folding scooter is in the folded position.

14. A folding scooter comprising:
   a base;
   a rear wheel rotatably connected to the base;
   a base shaft connected to the base;
   a front wheel rotatably connected to the base shaft;

a handlebar shaft having an upright position and a folded position;

a locking mechanism connected between the base shaft and the handlebar shaft including:

a first locking hinge member attached to the base shaft or the handlebar shaft and having a central aperture and first and second locking apertures;

a second locking hinge member attached to the handlebar shaft or the base shaft and having a central aperture and a third locking aperture;

a central pin extending through the central apertures of the first and second locking hinge members;

a locking pin passing through the third locking aperture of the second locking hinge member and sized to selectively engage the first or second locking apertures of the first locking hinge member, a push button positioned at a terminal end of the locking pin;

a bias spring urging the locking pin towards engagement with the first or second locking apertures of the first locking hinge member so that the push button may be pushed to remove the locking pin from engagement with the first or second locking apertures so that the handle bar shaft may be moved between the upright position and the folded position;

said base shaft and said handlebar shaft pivoting with respect to the base so that the folding scooter may be steered; and a locking hinge housing covering said locking mechanism, said locking hinge housing including an upper section that engages the handlebar shaft and a lower section that is connected to the base shaft and is positioned adjacent to the base, the lower section including a button aperture through which the push button protrudes, and said upper and lower sections of the locking hinge housing pivoting with respect to the base when the folding scooter is steered and said upper section of the locking hinge housing sliding with respect to the lower section of the locking hinge housing as the handlebar shaft moves between the upright position and the folded position.

15. The folding scooter of claim 14, wherein the first locking hinge member of the locking mechanism includes first and second locking hinge plates, wherein the first and second locking hinge plates include corresponding central apertures and corresponding first and second locking apertures.

16. The folding scooter of claim 15, wherein the second locking hinge member of the locking mechanism is received between the first and second locking hinge plates of the first locking hinge member.

17. The folding scooter of claim 16 wherein the first and second locking hinge plates of the first locking member are attached to the handlebar shaft and the second locking member is attached to the base shaft.

18. A folding scooter comprising:
a base having a socket;
a rear wheel rotatably connected to the base;
a base shaft connected to the base;
a front wheel rotatably connected to the base shaft;
a handlebar shaft having an upright position and a folded position;
a locking mechanism connected between the base shaft and the handlebar shaft including:
a first locking hinge member attached to the base shaft or the handlebar shaft and having a central aperture and first and second locking apertures;

a second locking hinge member attached to the handlebar shaft or the base shaft and having a central aperture and a third locking aperture;

a central pin extending through the central apertures of the first and second locking hinge members;

a locking pin passing through the third locking aperture of the second locking hinge member and sized to engage the first or second locking apertures of the first locking hinge member, a push button positioned at a terminal end of the locking pin;

a bias spring urging the locking pin towards engagement with the first or second locking apertures of the first locking hinge member so that the push button may be pushed to remove the locking pin from engagement with the first or second locking apertures so that the handle bar shaft may be moved between the upright position and the folded position;

said base shaft and said handlebar shaft pivoting with respect to the base so that the folding scooter may be steered; and a locking hinge housing covering said locking mechanism, said locking hinge housing including an upper section that engages the handlebar shaft and a lower section that is connected to the base shaft and is positioned within the socket of the base, the lower section including a button aperture through which the push button protrudes, and said upper and lower sections of the locking hinge housing pivoting with respect to the base when the folding scooter is steered and at least said upper section of the locking hinge housing pivoting with respect to the base as the handlebar shaft moves between the upright position and the folded position.

19. The folding scooter of claim 18 wherein the locking hinge housing covering is a single assembled piece.

20. A folding scooter comprising:
a base;
at least one rear wheel rotatably connected to the base;
a handlebar shaft having an upright position and a folded position, the handlebar shaft comprising a first locking hinge plate having a central aperture and a pair of locking apertures and a second locking hinge plate having a central aperture and a pair of locking apertures;

a base shaft having at least one lower locking hinge plate that is received between the first and second locking hinge plates of the handlebar shaft in an interlocking manner, the lower locking hinge plate comprising a central aperture, a first pair of locking apertures, and a second pair of locking apertures;

a front wheel rotatably connected to the base shaft; and a locking mechanism, the locking mechanism comprising a locking key having a push button, said locking key having a first locked position when the handlebar shaft is in the upright position and a second locked position when the handlebar shaft is in the folded position;

said base shaft and said handlebar shaft pivoting with respect to the base so that the folding scooter may be steered; and a locking hinge housing covering said locking mechanism, said locking hinge housing including an upper section that engages the handlebar shaft and a lower section that is connected to the base shaft and is positioned adjacent to the base, said lower section including a button aperture through which the push button protrudes, and said upper and lower sections of the locking hinge housing pivoting with respect to the base when the folding scooter is steered and said upper section of the locking hinge housing sliding with respect to the lower section of the locking hinge housing as the handlebar shaft moves between the upright position and the folded position.

* * * * *